United States Patent [19]

Davis et al.

[11] Patent Number: 5,072,145
[45] Date of Patent: Dec. 10, 1991

[54] COMPOSITE CENTER MODULE HOUSING USING SPECIFICALLY SHAPED SEGMENTS TO FORM FLUID CHANNELS

[75] Inventors: Timothy A. Davis, Rockford, Ill.; David A. Stark, Janesville; Scott M. Thomson, Beloit, both of Wis.; Gary W. Wigell, Lansing, Mich.; Duncan Lawrie, Erie, Pa.; Eugene V. Czerniewski, Rockford, Ill.

[73] Assignee: Sundstrand Corporation, Rockford, Ill.

[21] Appl. No.: 577,534

[22] Filed: Sep. 5, 1990

[51] Int. Cl.$^5$ .............................................. H02K 11/00
[52] U.S. Cl. ......................................... 310/54; 310/89; 310/91
[58] Field of Search .................... 310/89, 91, 53, 54, 310/42, 43, 71, 62, 63, 112; 156/84

[56] References Cited

U.S. PATENT DOCUMENTS

| 3,495,604 | 2/1970 | Trask II | 310/54 |
| 3,506,024 | 4/1970 | Erwin et al. | 357/76 |
| 3,534,755 | 10/1970 | Urbanosky | 137/81.5 |
| 4,329,603 | 5/1982 | Ballard | 310/54 |
| 4,570,094 | 2/1986 | Trommer | 310/68 R |
| 4,603,344 | 7/1986 | Trommer | 357/76 |
| 4,807,342 | 2/1989 | Lapeyre | 29/157.3 |
| 4,828,184 | 5/1989 | Gardner et al. | 239/590.5 |
| 4,858,304 | 8/1989 | Weldon et al. | 310/42 |
| 4,875,956 | 10/1989 | Brackett | 156/84 |

Primary Examiner—Steven L. Stephan
Assistant Examiner—Matt Nguyen
Attorney, Agent, or Firm—Antonelli, Terry, Stout & Kraus

[57] ABSTRACT

A generator housing including a housing module having at least one relatively complex internal passage formed therein and housing flow control components for circulating a fluid coolant through the generator. The housing module is formed by forming a plurality of sub-components each having at least one relatively simple passage formed therein for defining part of the at least one relatively complex internal passage. The sub-components are combined together as by bonding to form the housing module with at least one relatively complex internal passage. The flow control components are contained in bores within the housing module in fluid communication with the relatively complex internal passage therein. The housing module if formed of a relatively lightweight, non-metallic material to enable reduction in the weight of the generator housing in cost-effective and technically accepted manner thereby providing an improved generator which can be used in aircraft.

12 Claims, 8 Drawing Sheets

COMPOSITE CENTER MODULE HOUSING USING SPECIFICALLY SHAPED SEGMENTS TO FORM FLUID CHANNELS

TECHNICAL FIELD

The present invention is directed to an electrical generator and more particularly, to an improved housing for an electric generator and a method of making the housing.

BACKGROUND ART

A significant portion of the generator weight in modern electrical power generating systems is contributed by the generator housing. Where the generator is part of a moving vehicle or an aircraft, energy efficiency and performance requirements dictate that the weight of the generator including the generator housing be as low as possible. In the past, generator housings for aircraft generators have been formed of metal. Metal forming techniques such as die casting and post casting machining processes have facilitated the construction of the generator housings in the desired form. While relatively lightweight, nonmetallic materials are, per se, known, it can be difficult to fabricate complex structures, particularly those containing complex internal passages, with such materials in a technically acceptable and costeffective manner.

One known type of generator utilized in aircraft is a brushless generator. The brushless generator typically has three distinct generating systems, including a main generator, an exciter and a permanent magnet generator. The permanent magnet generator includes permanent magnets for establishing a magnetic field which is employed to induce a voltage in a set of windings. The current produced as a result is in turn employed to produce a magnetic field in the exciter; and this magnetic field in turn is employed to induce an even higher level of current, typically three-phase alternating, which is then employed to produce a magnetic field for the main generator.

In order to avoid the use of brushes, it is necessary that the magnetic field of the main generator be in the rotor so that the output of the system can be taken from the stator of the main generator. To generate a suitable magnetic field in the rotor, it is necessary to utilize direct current, as opposed to alternating current. Since the output of the exciter is an alternating current, this current must be rectified to direct current. A rectifier assembly is used for this purpose. In order to avoid resorting to brushes, it is necessary that the rectifier assembly interconnecting the exciter and the main generator field winding be carried by the rotor of the generator. U.S. Pat. Nos. 4,570,094; 4,603,344 and 4,628,219 disclose examples of known rotating rectifier assemblies.

The diode semiconductor devices used in the rectifier assemblies dissipate power in the form of heat during their use. Without proper attention to cooling, the diode semiconductor devices will fail. In the known rotating rectifier assemblies of the aforementioned U.S. Patents, the diode semiconductor devices and other assembly components are compressed in a direction along the axis of rotation of the rectifier assembly for maintaining good electrical contact and for maintaining contact of the diode wafers with adjacent heat sinks. The cooling of the diode semiconductor devices is accomplished by circulation of a coolant in contact with the heat sinks.

Cooling of the other components of the generator such as the main stator, exciter, and permanent magnet generator stators 10 is also important for maintaining performance of the generator. For this purpose, internal fluid coolant such as oil is necessary. The oil also serves as a gear and bearing lubricant.

It is known from U.S. Pat. Nos. 3,495,604; 3,506,024 and 3,534,755 to construct fluidic amplifiers or the like by assembling a plurality of laminae each having different fluid passageways therethrough. U.S. Pat. No. 4,807,342, relates to a heat exchanger structure formed of a plurality of laminae. U.S. Pat. 4,828,184 concerns a nozzle formed of two laminae.

DISCLOSURE OF INVENTION

An object of the present invention is to provide an improved generator and, particularly, a housing for a generator and a method of making the housing, which overcome the aforementioned problems in providing a generator in a technically acceptable and cost-effective manner.

A further object of the invention is to provide an improved generator, a housing for a generator and a method a making the housing, wherein the housing has at least one relatively complex internal passage yet is fabricated in a technically acceptable and cost-effective manner.

These and other objects of the invention are attained by the improved generator of the invention which comprises means for converting mechanical energy input to the generator to electrical energy and housing means for the converting means, wherein the housing 10 means includes a housing structure having at least one relatively complex internal passage formed therein. The housing structure is formed by a plurality of sub-components each having at least one relatively simple passage formed therein for defining part of the at least one relatively complex internal passage. The sub-components are combined together for forming the housing structure with the at least one reactively complex internal passage.

In a disclosed form of the invention, the housing structure is a housing or module for flow control components of the generator which control the flow of a fluid coolant through the generator. The at least one relatively complex passage includes bores which contain the flow control components for controlling the flow of fluid coolant therethrough.

The sub-components of the housing structure can be formed of a synthetic resin, for example, as by injection molding and possibly with subsequent machining to form the relatively simple passages therein. Preferably, the sub-components are slabs formed with planar surfaces which face one another when combined. The relatively simple passages formed in the slabs include openings in the facing planar surfaces of slabs at positions which are aligned with one another when the slabs are combined for forming the at least one relatively complex passage. The sub-components can be combined together by bonding using an adhesive. Alternatively, the sub-components could be merely mechanically clamped to one another using a gasket for sealing for combining them to form the housing structure with the at least one relatively complex passage therein.

The disclosed generator housing includes a main structural housing having a generally cylindrical shape for supporting the means for converting mechanical energy into electrical energy. The housing structure with the at least one relatively complex internal passage therein is mounted on one end of the generally cylindrical main structural housing. The generator housing includes means for circulating a hydraulic fluid in the generator for cooling the generator. The means for circulating includes flow control components which are supported in bores in the housing structure in fluid communication with the at least one relatively complex internal passage. This arrangement permits the main structural housing of the generator to be formed of a higher strength, lightweight metal alloy such as an aluminum alloy as by casting and machining or a fiber reinforced nonmetallic composite structure such as a reinforced fiber PEEK, while the housing structure supporting the flow control components and having the at least one relatively complex internal passage therein can be fabricated from a lower strength, lighter weight, non-metallic material, for example, from a synthetic resin or a composite material containing synthetic resin.

A method according to the invention for making a generator housing wherein coolant flow control components are provided for controlling the flow of a fluid coolant through the generator, comprises the steps of forming at least a portion of the housing with at least one relatively complex internal passage therein by combining a plurality of sub-components together, each of the sub-components having at least one relatively simple passage formed therein for defining part of the at least one relatively complex internal passage, the at least one relatively complex internal passage including at least one bore for receiving at least one of the flow control components, and inserting the at least one flow control component in the at least one bore. Preferably, the sub-components are in the form of slabs with planar surfaces which face one another when combined. The relatively simple passages formed in the sub-components include openings in the facing planar surfaces at positions which align with one another for forming the at least one relatively complex internal passage.

From the above, it can be seen that the generator, housing for generator and method of making a generator housing of the invention make it possible to fabricate at least a portion of the generator housing from a relatively lightweight, non-metallic material in a technically acceptable and cost-effective manner with the housing nevertheless having at least one relatively complex passage therein for coolant flow and retention of flow control components.

These and other objects, features and advantages of the present invention will become more apparent from the following description when taken in connection with the accompanying drawings, which show, for the purpose of illustration only, two embodiments in accordance the present invention.

BEST MODE FOR CARRYING OUT THE INVENTION

Figure 1:
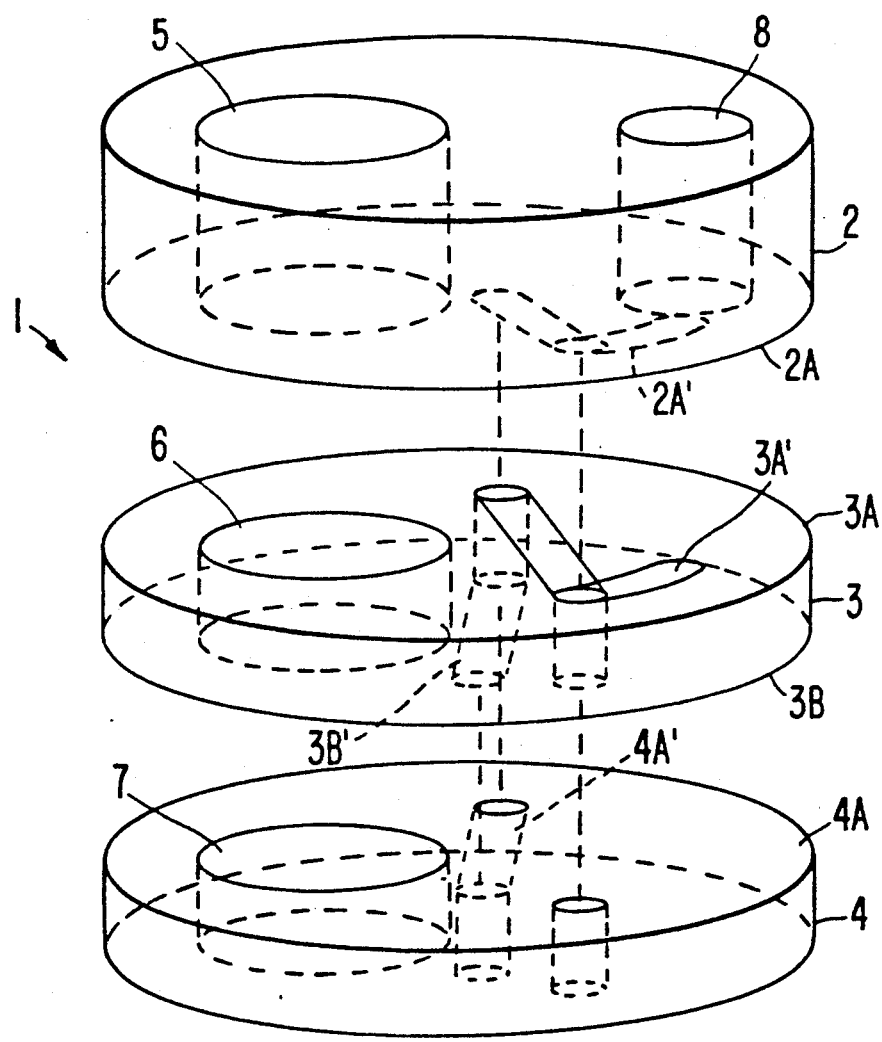
FIG. 1 is an isometric view of a first embodiment of a housing for an electric generator according to invention illustrating three sub-components of the housing in disassembled, spaced relation prior to being combined together for forming the housing.
Figure 2:
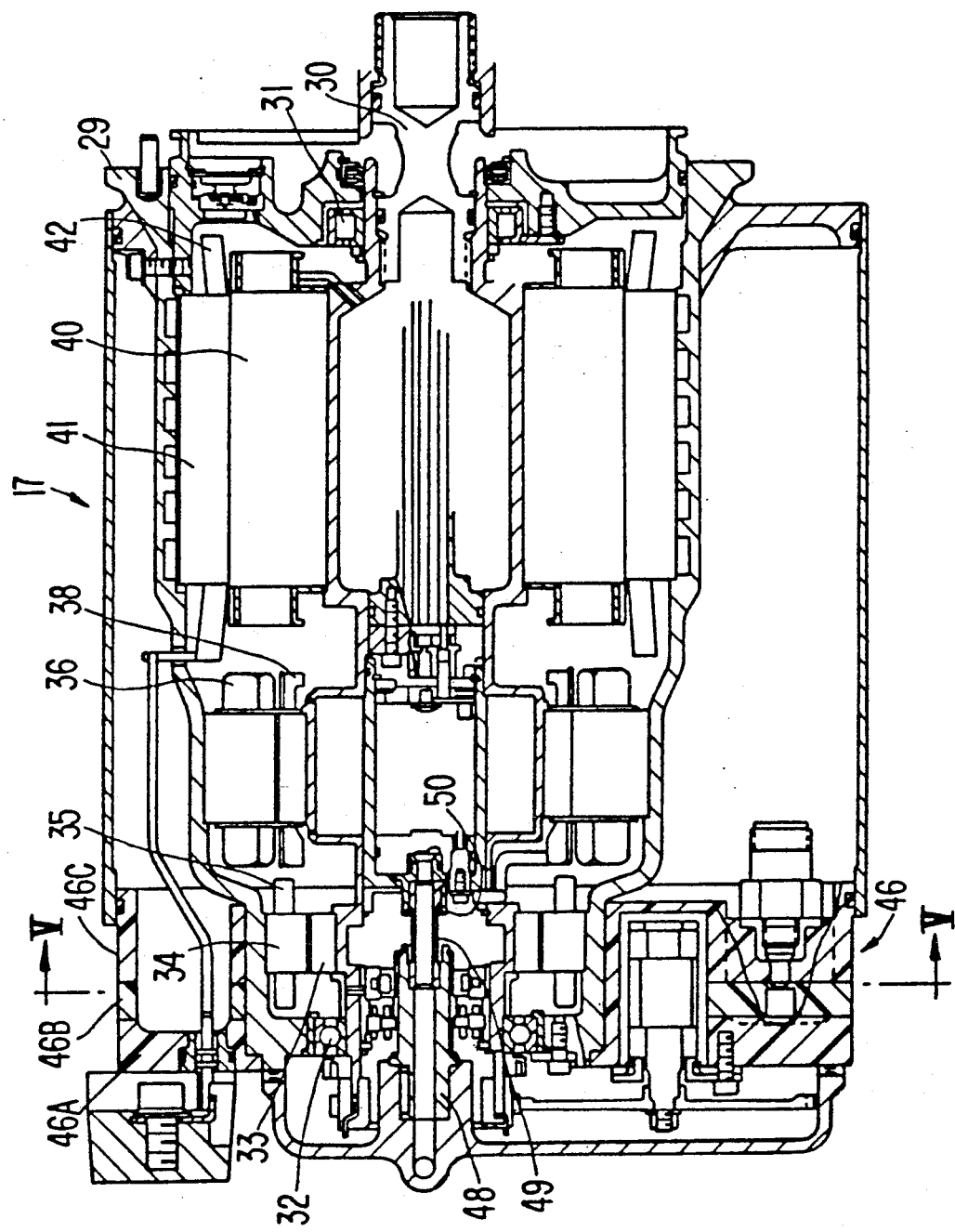
FIG. 2 cross-sectional view taken along the central, longitudinal axis of an generator according to a preferred embodiment of the invention, the cross-section being taken along the line II—II of a generator as shown in FIG. 3.
Figure 3:
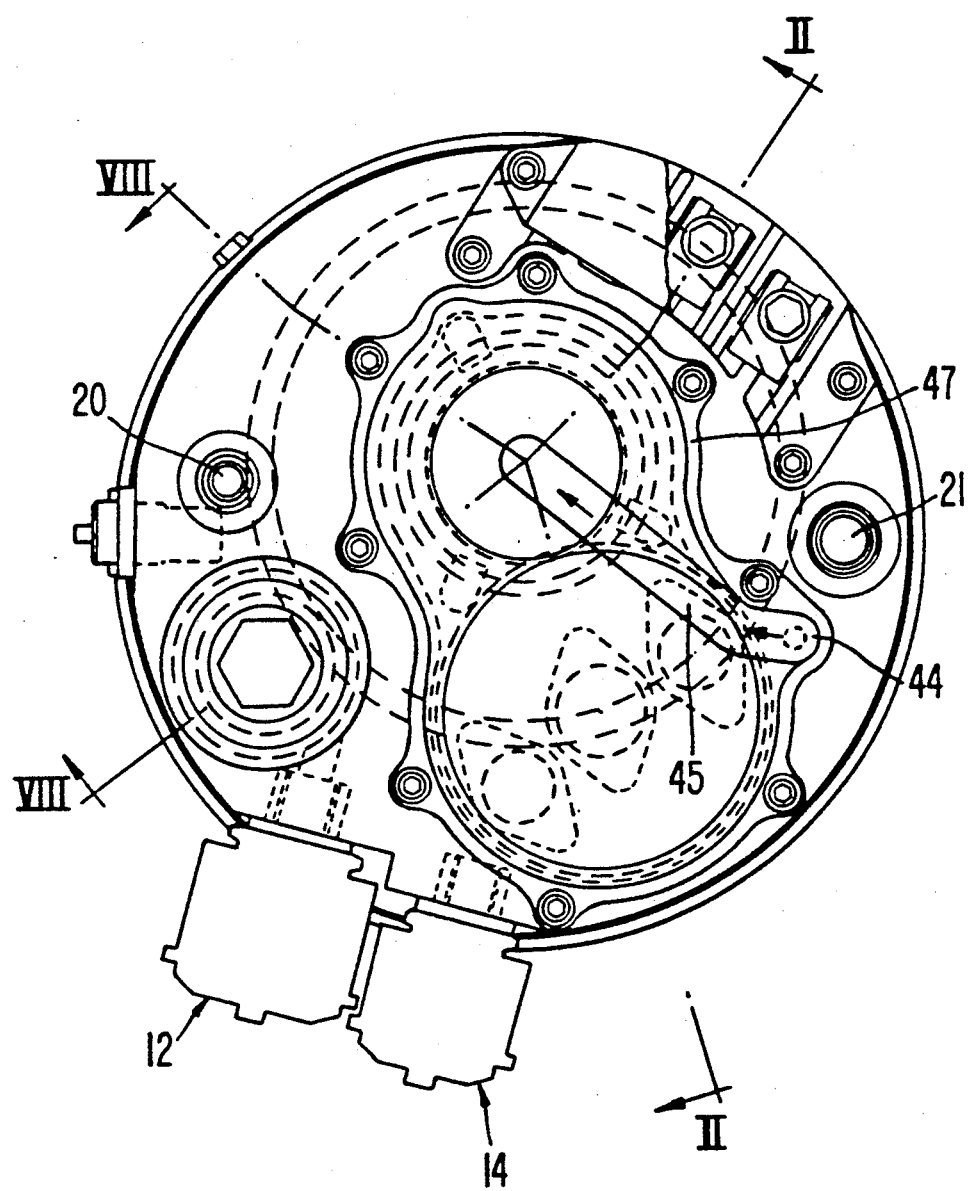
FIG. 3 is an end view of the generator of FIG. 2 taken from the left side of FIG. 2 and looking in the direction of the longitudinal central axis of the generator.
Figure 4:
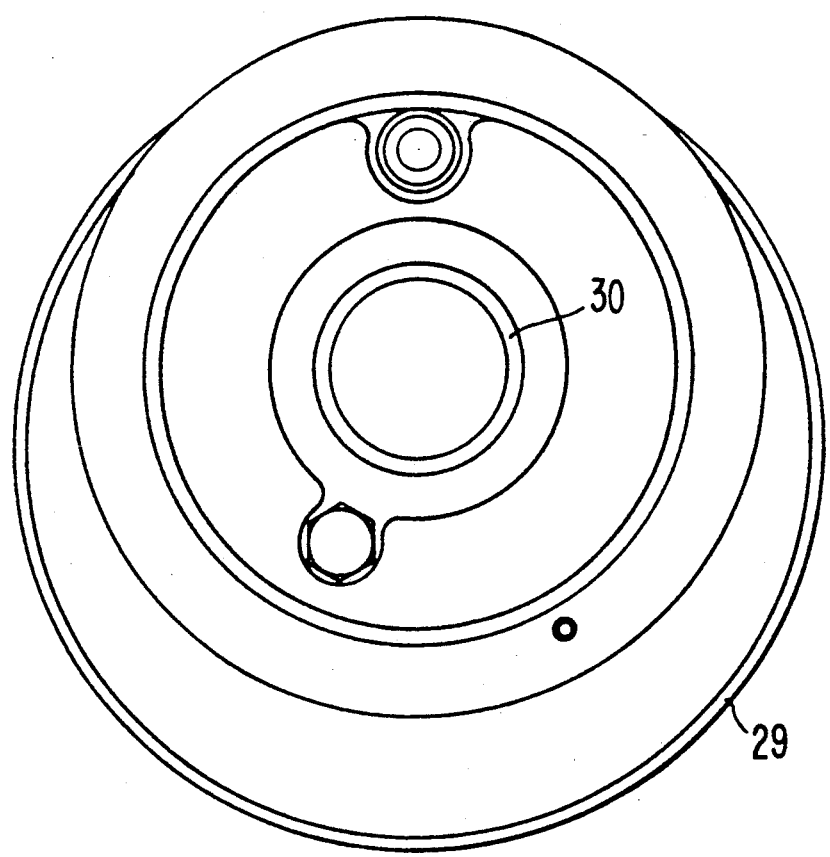
FIG. 4 view of the opposite end of the generator from that shown in FIG. 3 as seen from the right side of FIG. 2 looking in the direction of the longitudinal axis of the generator.
Figure 5:
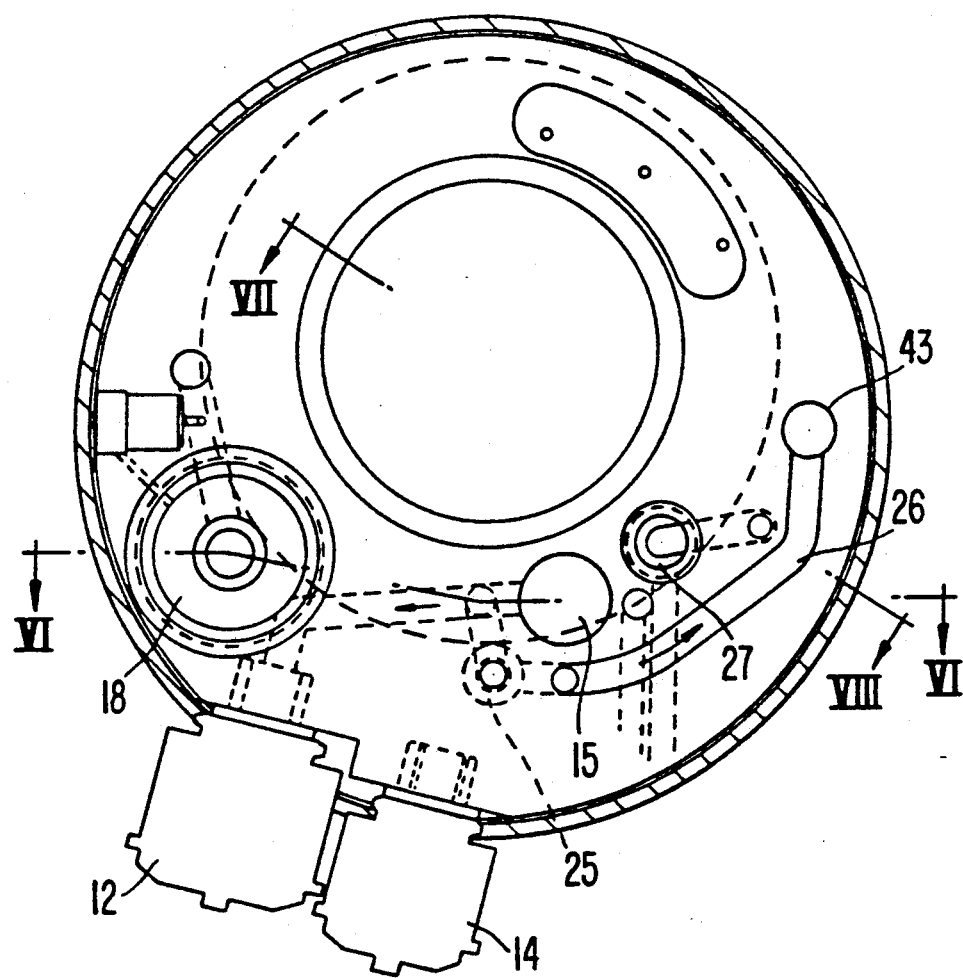
FIG. 5 is a cross-sectional view of the generator taken the line V—V in FIG. 2.
Figure 6:
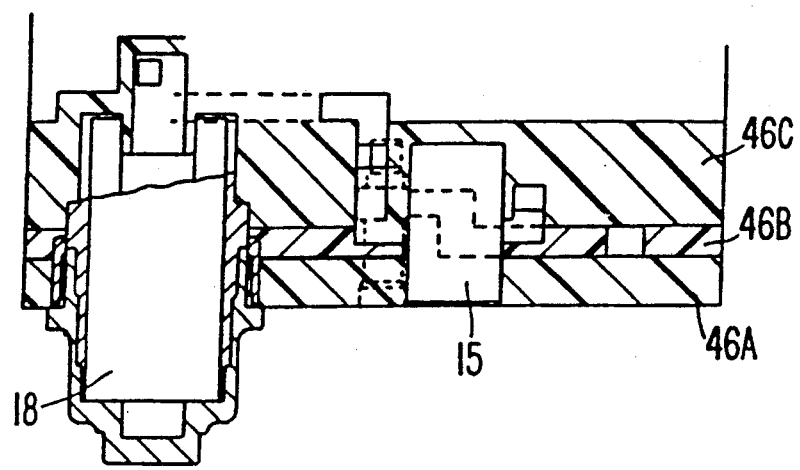
FIG. 6 is a cross-sectional view through a scavenge filter and pump for the oil coolant taken along the line VI—VI in FIG. 5.
Figure 7:
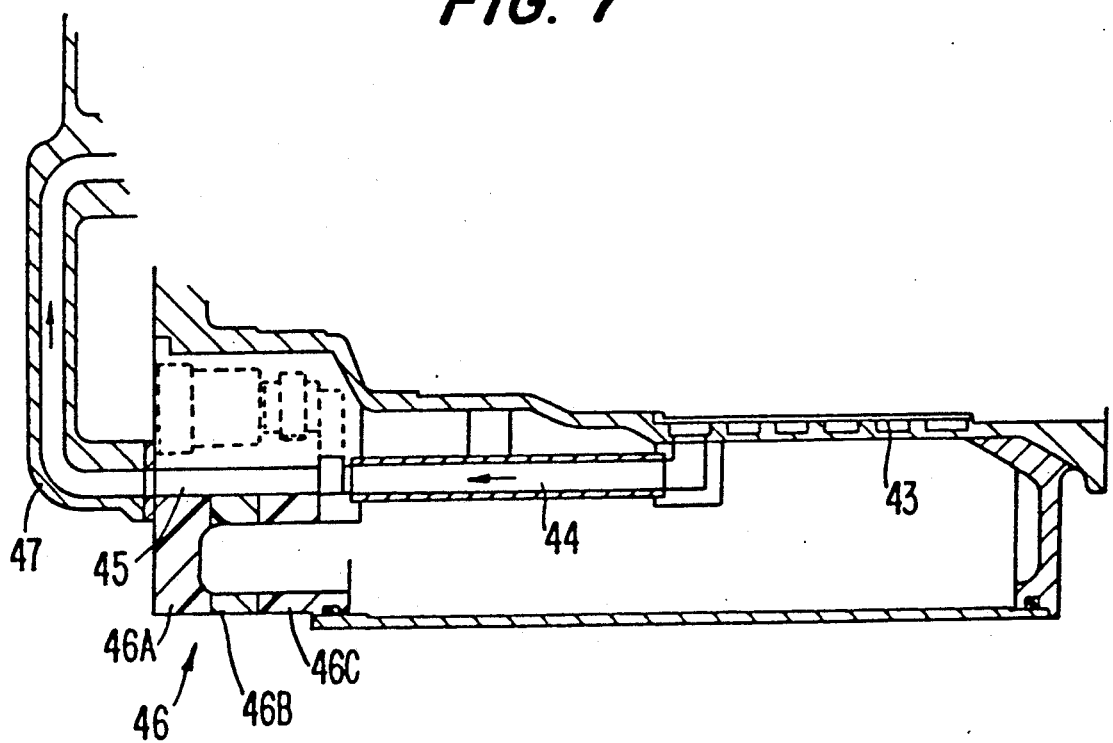
FIG. 7 is a cross-sectional view through a portion of the generator taken along the line VII—VII in FIG. 5.
Figure 8:
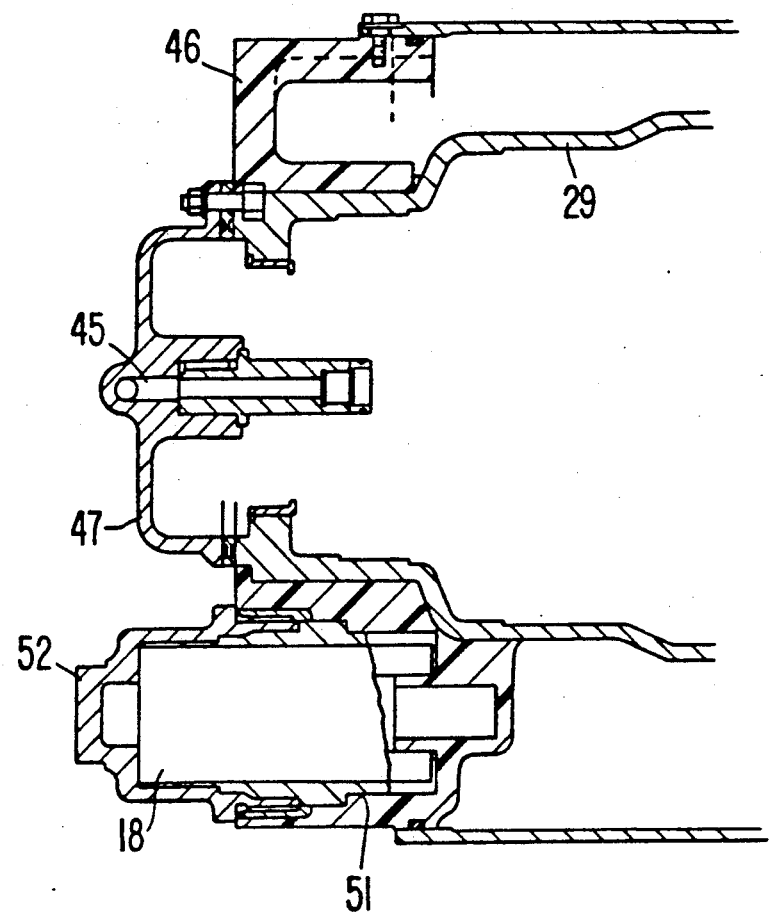
FIG. 8 is a cross-sectional view through a portion of the generator taken along the line VIII—VIII in FIG. 3.
Figure 8A:
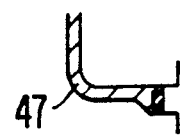

Referring now to the drawings, and particularly FIG. 1, a housing 1 according to the invention for an electric generator adapted to be cooled by the circulation of a coolant fluid therethrough comprises a plurality of sub-components 2, 3 and 4. The sub-components are in the form of slabs having planar surfaces 2A and 3A and 3B and 4A which face one another when the sub-components are combined to form the housing. The surfaces which face one another each include an opening 2A', 3A', 3B' and 4A' in the facing planar surfaces at positions which are aligned with one another when the sub-components are combined for forming at least one relatively complex passage through the housing 1 formed of the sub-components 2, 3 and 4. As illustrated in FIG. 1, each of the sub-components 2, 3 and 4 includes axially directed bores extending therethrough and also portions of passages extending in the plane of the planar surfaces thereof. These latter passage portions together define an internal passage extending along the plane of abutting planar surfaces when the sub-components are positioned with their adjacent planar surfaces abutting one another in a fluid sealing manner. For example, the opposed planar surfaces surround the aligned bores and passage portions. The planar surfaces can be bonded to one another using an adhesive. Alternatively, the sub-components could be sealingly clamped to one another with an appropriate mechanical clamping arrangement with gaskets.

When the sub-components 2, 3 and 4 are combined, the housing I has a relatively complex passage for fluid coolant therethrough formed by the cooperating relatively simpler passage portions formed in each of the sub-components. Because of this construction, the sub-components of the housing can be readily fabricated from a relatively lightweight, non-metallic material such as a synthetic resin or other material. Illustratively, a thermoplastic polyetheretherketone (PEEK) could b used to form the sub-components. The housing of this construction is advantageously lighter in weight as compared with the known metal housings and can be produced in a technically acceptable, cost-effective manner.

In the embodiment illustrated in Figure the sub-components 2, 3 and 4 each include an axially directed bore 5, 6 and 7, respectively, which are aligned with one another when the sub-components are combined to form a bore for a flow control component of a hydraulic circuit for circulating a fluid coolant through the generator. The relatively complex internal passage through the housing which includes both axially directed passage portions and passage portions extending in the plane of the facing planar surfaces also includes a bore 8 for receiving a flow control component. Thus, the housing not only forms a portion of the generator housing, in a manner described in more detail in connection with the embodiment of FIGS. 2–9, but also constitutes a housing or module for flow control components of the hydraulic circuit cooling arrangement of the generator.

Figure 9:
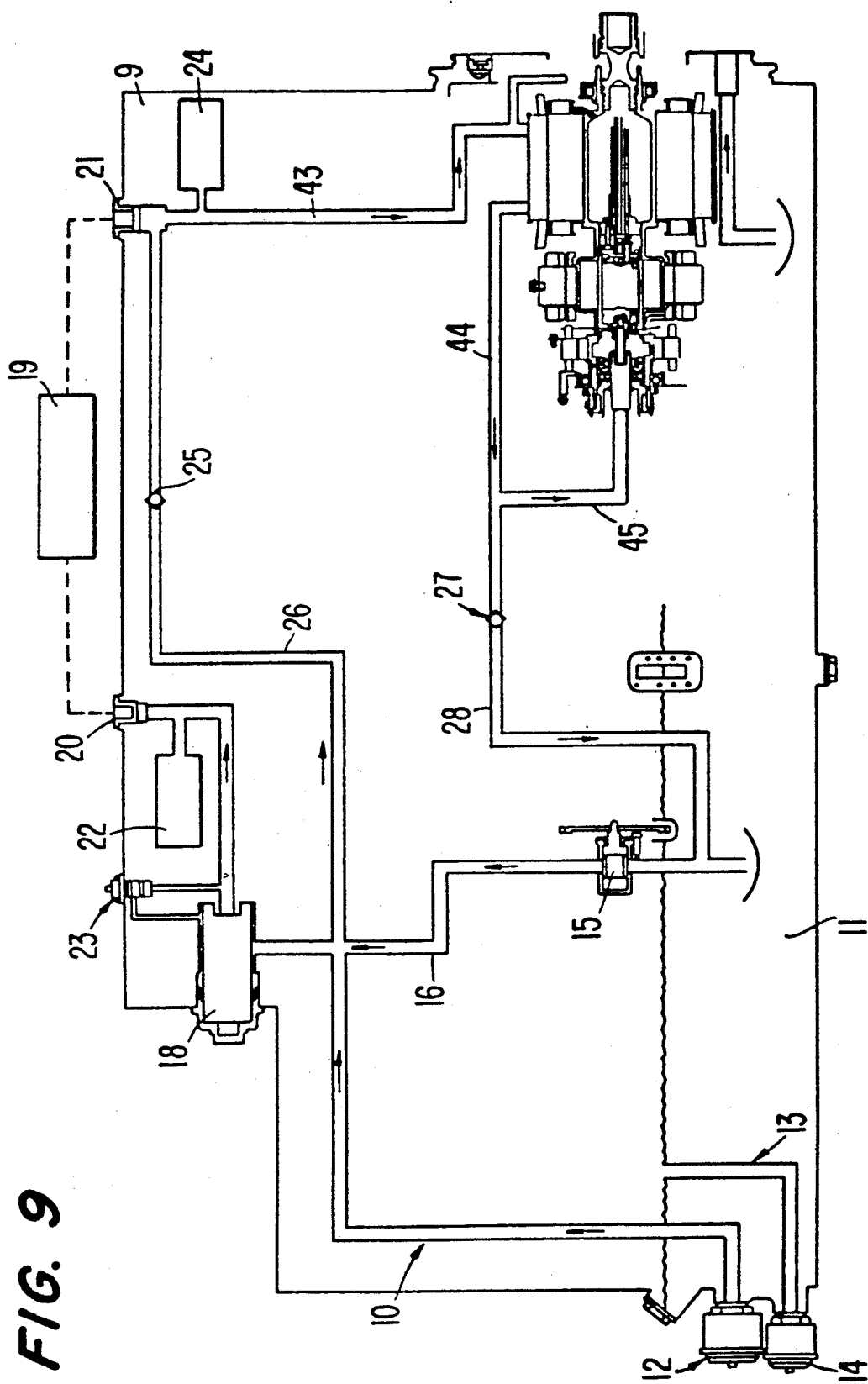
FIG. 9 is a schematic illustration of the hydraulic cooling arrangement of the generator of FIG. 2.

A generator 9 according to a preferred embodiment of the invention is illustrated in FIGS. 2–9. Particularly, a hydraulic circuit cooling arrangement 10 of the generator is illustrated schematically in FIG. 9. The generator 9 is depicted in more detail in FIGS. 2–8. As shown in FIG. 9, the generator 9 includes a cooling oil sump 11 formed in the lower portion of the generator housing. Coolant oil is initially supplied to the generator 9 through a pressure fill fitting 12. When the level of oil in the sump 11 reaches the top of a standpipe 13 in the sump it is discharged from the generator 9 by way of the standpipe and overfill fitting 14 providing an indication to stop pressure filling of oil. The fittings 12 and 14 are then closed by inserting threaded plugs therein.

The hydraulic circuit cooling arrangement 10 of the generator 9 further includes a scavenge pump 15 for circulating cooling oil from the sump 11 through a relatively complex internal passage 16 in a housing 17 of the generator formed according to the invention, to a scavenge filter 18 for circulation in the components of the generator for generating electricity from mechanical motion, by way of an external cooler 19. The generator includes an oil out fitting 20 and an oil in fitting 21 through which the oil exits to and returns from the cooler 19. The hydraulic circuit cooling arrangement 10 further comprises an oil out temperature bulb 22, a scavenge filter delta pressure indicator 23, an oil in temperature bulb 24, cooler bypass bulb 25 and bypass passage 26 and a pressure relief valve 27 in return passage 28. In addition to the relatively complex internal passages 16, 26 and 28, at least portions of which are formed in housing 17 of the generator 9, the housing 17 of the invention also includes bores within which the other flow control components, namely the pressure scavenge pump 15, the indicator 23, oil out temperature bulb 22, cooler bypass valve 25, oil in temperature bulb 24 and pressure relief valve 27 are located.

As shown in FIGS. 2–8, the generator 9 has a housing 17 which includes a main structural housing 29 having a generally cylindrical shape. The main structural housing can be formed of fiber reinforced PEEK for example and supports within the housing, components of the brushless generator 9 for converting mechanical energy input to the generator to electrical energy. These components include an elongated shaft 30 supported by bearings 31 and 32 and carrying a series of permanent magnets 33 thereon. A stator 34 provided with winding 35 surrounds the magnets 33 and defines a permanent magnet generator therewith. Electrical current generated in the windings 35 during rotation of the shaft 30 after being rectified to direct current is provided with via suitable conductors to windings 36 in an exciter stator 37. Axially aligned with the exciter stator 37 and carried by the shaft 30 are windings 38 in which current will be induced during rotation of the shaft.

The current induced in the winding 38 is fed to a rectifier assembly 39 contained within the shaft where the current is rectified to direct current from the three-phase alternating current supplied. Direct current from the rectifier 39 is then fed to a main field winding 40 carried by the shaft 30. The main field winding is in alignment with a main generator stator 41. The stator 41 includes windings 42 in which an alternating current is induced and which, by suitable connectors not shown, the windings may be connected to suitable loads. An engine, such as an aircraft engine, is used to rotate the shaft 30 of the brushless generator 9 for generating AC electrical power. During this rotation the rectifier assembly 39 and shaft 30 are rotated about the axis A—A at high speeds, for example up to 30,000 rpm.

Oil which is pumped by the scavenge pump 15 through the scavenge filter 18 and oil out fitting 20 to the external cooler and returned to the generator 9 by way of the oil in fitting 21 is directed through a cooling passage 43 to a fluid passage 44 in the main structural housing 29 about the main stator 41 for cooling the stator. From the stator cooling passage 43, oil is conveyed through a passage 44. One end of the fluid passage 44 communicates with the sump 11. The pressure relief valve 27 in the passage prevents flow to the sump unless pressures are greater than some preset pressure, for example, 130 psi. Thus, the pressure relief valve establishes a fixed pressure oil supply to the generator shaft 30. Fluid passage 45 extends from the fluid passage 44 at a location upstream of the pressure relief valve 27 for circulating oil within the shaft 30 for cooling the windings 38 and 40 as well as the rectifier 39. The oil is also used for lubrication purposes in connection with the bearings 31 and 32 rotatably supporting the shaft 30.

The fluid passage 45 extends through a composite center module housing 46 and an end cover 47 from where it is directed to the shaft 30 by way of transfer tube 49 and support 48 extending between the end cover 47 and an inlet fitting 50 for circulating the oil through the shaft 30. At the opposite end of the shaft 30 the oil is returned to sump 11.

The composite center module housing 46 is formed of sub-components 46A, 46B, and 46C which are in the form of slabs formed with planar surfaces which face one another when the sub-components are combined in the manner illustrated to form the housing 46. Each of the sub-components includes fluid passages formed therein for defining part of the relatively complex internal passages formed in the housing 46 when the sub-components are combined together. These relatively complex passages include the bypass passage 26 extending from the pressure fill fitting to cooling passage 43 immediately below the oil in fitting 21 by way of cooling bypass valve 25. The passage 16 also leads from the sump 11 to scavenge filter 18 and oil out fitting 20 by way of scavenge pump 15, oil out temperature bulb 22 and scavenge filter delta pressure indicator 23. These last-mentioned flow control components are located within corresponding bores formed in the composite housing 46 in communication with the passage 16. The sub-components 46A, 46B and 46C of the housing 46 can each be formed of a lightweight, non-metallic material such as a synthetic resin by molding with the relatively simpler portions of the complex passages of the hole being located in each. One material that can be used is a thermoplastic polyetheretherketone (PEEK). The sub-components are combined together using an adhesive to form the composite housing 46 which, in turn, can be adhesively bonded or otherwise secured to the main structural housing 29 at one end thereof for forming the housing 17 of the generator 9. The flow control components can be mechanically retained within their respective bores in the housing 46 or bonded therein. For example, the scavenge filter 18 is retained within bore 51 in the module housing 46 by means of a cover 52 secured to the housing 46 as by threaded connection. The metal fittings 12, 14, 20 and 21, or at least portions thereof, are molded directly into the PEEK laminate assembly to enable putting oil in and out and servicing of the module.

The improved generator 9 of the invention is lighter in weight as a result of the aforementioned construction of its housing 17 as compared with known generator housings. Moreover, the composite center module housing 46 with its relatively complex flow passages and bores for retaining flow control components can, nevertheless, be manufactured in a technically acceptable and cost-effective manner using lightweight, non-metallic materials according to the method of the invention.

While we have shown and described only two embodiments in accordance with the present invention, it is understood that the same is not limited thereto, but is susceptible to numerous changes and modifications as known to those skilled in the art. For example, the housing of the generator can include more than one composite module housing. Therefore, we do not wish to be limited to the details shown and described herein, but intend to cover all such changes and modifications as are encompassed by the scope of the appended claims.

We claim:

1. A generator comprising means for converting mechanical energy input to the generator to electrical energy, housing means for housing said means for converting, said housing means including a housing structure having at least one relatively complex internal passage formed therein, said housing structure being formed by a plurality of sub-components each having at least one relatively simple passage formed therein for defining a part of the at least one relatively complex internal passage, said sub-components being combined together to form said housing structure with said at least one relatively complex internal passage, said at least one relatively complex internal passage including bores for flow control components, and means for circulating a hydraulic fluid in said generator for cooling and lubricating said generator, said means for circulating including flow control components which are supported in said bores of said at least one relatively complex passage in said housing structure.

2. A generator according to claim 1, wherein said sub-components are bonded to one another to form said housing structure having at least one relatively complex passage.

3. A generator according to claim 1, wherein said sub-components are slabs formed with planar surfaces which face one another, said relatively simple passages formed in said sub-components including openings in said facing planar surfaces at positions which are aligned with one another for forming said at least one relatively complex passage.

4. A generator according to claim 1, wherein said generator is an aircraft generator and said sub-components of said housing structure are formed of a relatively light weight, non-metallic material.

5. A generator according to claim 4, wherein the material of said sub-components includes a synthetic resin.

6. A generator according to claim 1, wherein said housing means further comprises a main structural housing supporting said means for converting, said housing structure with said at least one relatively complex internal passage being mounted on said main structural housing.

7. A generator according to claim 1, wherein said flow control components include pump means for circulating a fluid coolant in said generator to cool said generator, said pump means being supported in a bore in said housing structure, said at least one relatively complex internal passage conveying fluid coolant to and/or from said pump means.

8. A generator according to claim 1, further comprising a valve means in said at least one relatively complex internal passage for controlling the flow of a fluid coolant therethrough.

9. A generator according to claim 1, wherein said housing means includes a main structural housing having a generally cylindrical shape, said housing structure with said at least one relatively complex internal passage being mounted on one end of said generally cylindrical main structural housing.

10. A housing for an electric generator adapted to be cooled by the circulation of a coolant fluid therethrough, said housing comprising a housing structure having at least one relatively complex internal fluid coolant passage therein, said housing structure being formed by a plurality of sub-components each having at least one relatively simple passage formed therein for defining part of the at least one relatively complex internal passage, said sub-components being slabs formed with planar faces which face one another and combined together to formed said housing structure with said at least one relatively complex internal passage, said relatively simple internal passage formed in said sub-components including openings in said facing planar surfaces at positions which are aligned with one another for forming said at least one relatively complex internal passage, and wherein said at least one relatively complex internal passage includes a bore in the housing structure which contains a pump for pumping the fluid coolant through said generator.

11. A housing according to claim 10, wherein said sub-components are formed of a non-metallic material.

12. A housing according to claim 10, further comprising a main structural housing, said housing structure formed of said plurality of sub-components being mounted on said main structural housing.

* * * * *